US012186902B2

(12) United States Patent
Takagi

(10) Patent No.: US 12,186,902 B2
(45) Date of Patent: Jan. 7, 2025

(54) EXTERNAL GEAR, WAVE DECELERATOR, AND ROBOT

(71) Applicant: Nidec-Shimpo Corporation, Nagaokakyo (JP)

(72) Inventor: Daisuke Takagi, Nagaokakyo (JP)

(73) Assignee: Nidec-Shimpo Corporation, Kyoto (JP)

( * ) Notice: Subject to any disclaimer, the term of this patent is extended or adjusted under 35 U.S.C. 154(b) by 322 days.

(21) Appl. No.: 17/891,333

(22) Filed: Aug. 19, 2022

(65) Prior Publication Data
US 2023/0014532 A1 Jan. 19, 2023

(30) Foreign Application Priority Data
Jul. 16, 2021 (JP) .................................. 2021-117510

(51) Int. Cl.
*B25J 9/10* (2006.01)
*F16H 57/01* (2012.01)
*G01L 1/00* (2006.01)

(52) U.S. Cl.
CPC ............ *B25J 9/1025* (2013.01); *F16H 57/01* (2013.01); *G01L 1/00* (2013.01); *F16H 2057/012* (2013.01)

(58) Field of Classification Search
CPC ............................. G01L 1/00; F14H 2057/012
See application file for complete search history.

(56) References Cited

U.S. PATENT DOCUMENTS

| 11,874,191 B2 * | 1/2024 | Heim ...................... B25J 9/1025 |
| 2004/0079174 A1 * | 4/2004 | Horiuchi ............... G01L 3/1457 |
| | | 73/862.338 |

FOREIGN PATENT DOCUMENTS

| CA | 2035133 A1 * | 1/1991 |
| CN | 114111558 A * | 3/2022 |
| CN | 115366131 A * | 11/2022 |
| JP | 2000-131160 A | 5/2000 |
| WO | 2020/149204 A1 | 7/2020 |

OTHER PUBLICATIONS

English translation of CN114111558 accessed from worldwide. espacenet.com.*
English translation of CN115366131 accessed from worldwide. espacenet.com.*

* cited by examiner

*Primary Examiner* — David Z Huang
*Assistant Examiner* — Jean F Morello
(74) *Attorney, Agent, or Firm* — Keating & Bennett, LLP

(57) ABSTRACT

An external gear includes a body, external teeth, a diaphragm, and a strain gauge. The diaphragm extends in a direction intersecting with an axial direction on another side in of the body the axial direction. The strain gauge is on at least one of a surface on one side of the diaphragm in the axial direction and a surface on another side of the diaphragm in the axial direction. The strain gauge is only in a region that is about a half or less of a radial length from one end of the diaphragm in the axial direction to the other end of the diaphragm in the axial direction with a radial midpoint between the one end of the diaphragm in the axial direction and the other end of the diaphragm in the axial direction as a center in a section passing through the central axis.

17 Claims, 12 Drawing Sheets

[Fig. 1]
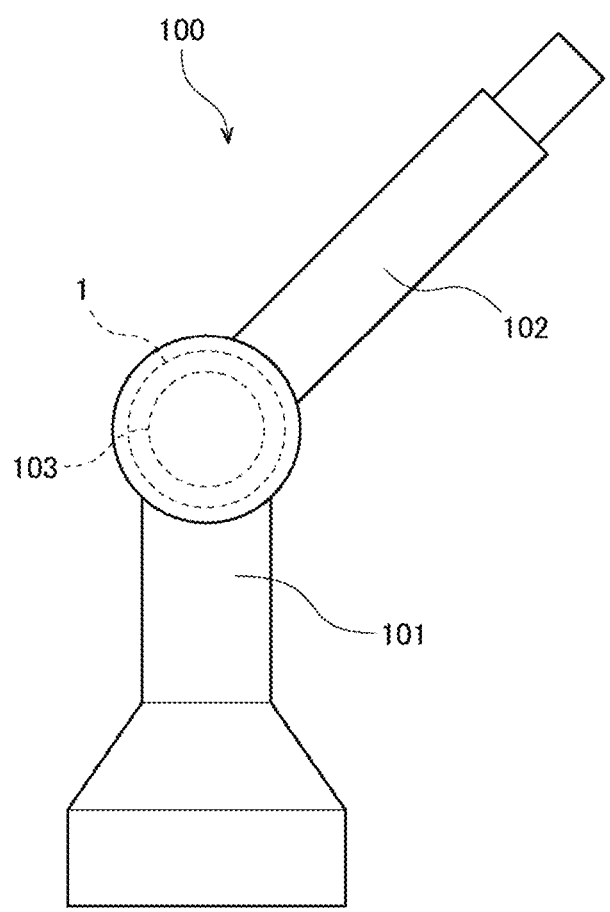

[Fig. 2]
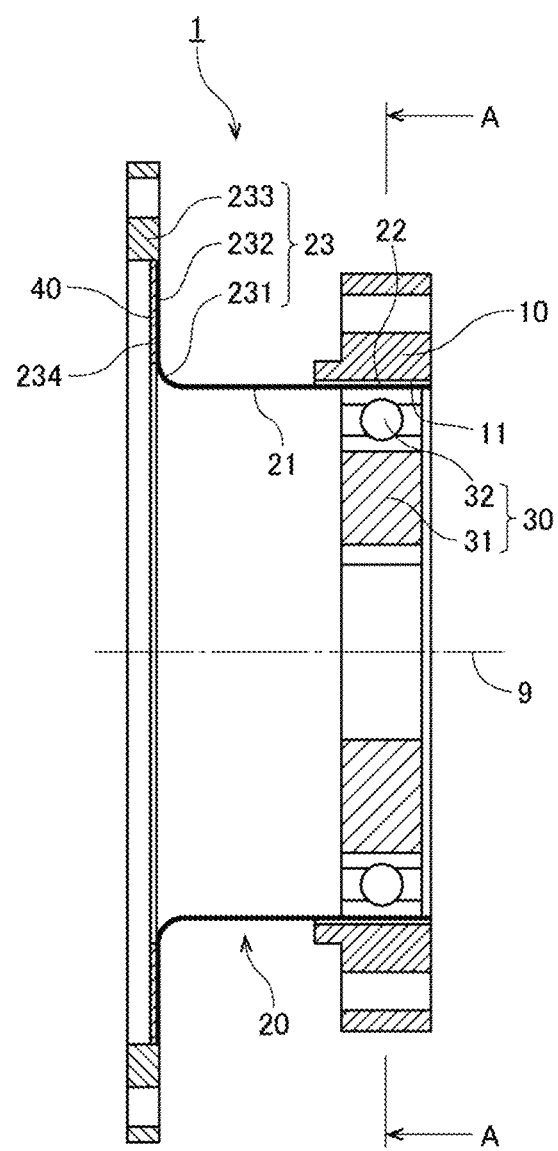

[Fig. 3]
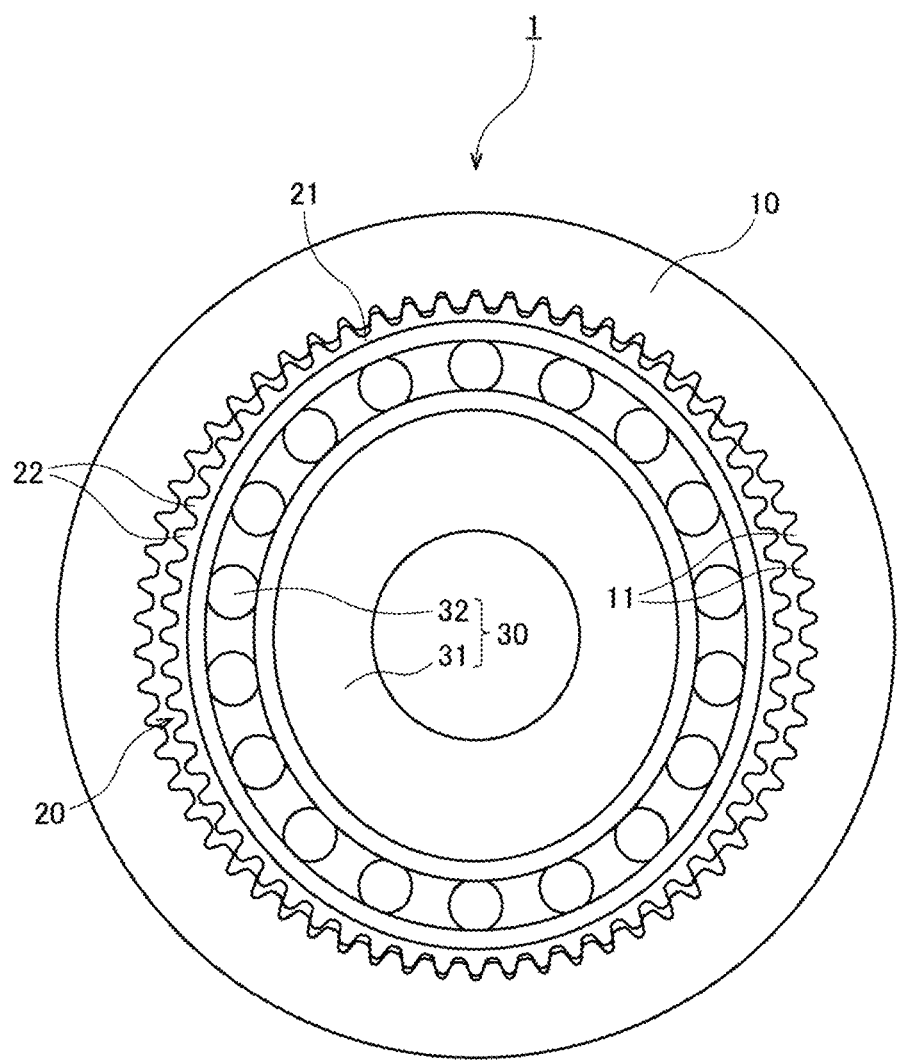

[Fig. 4]
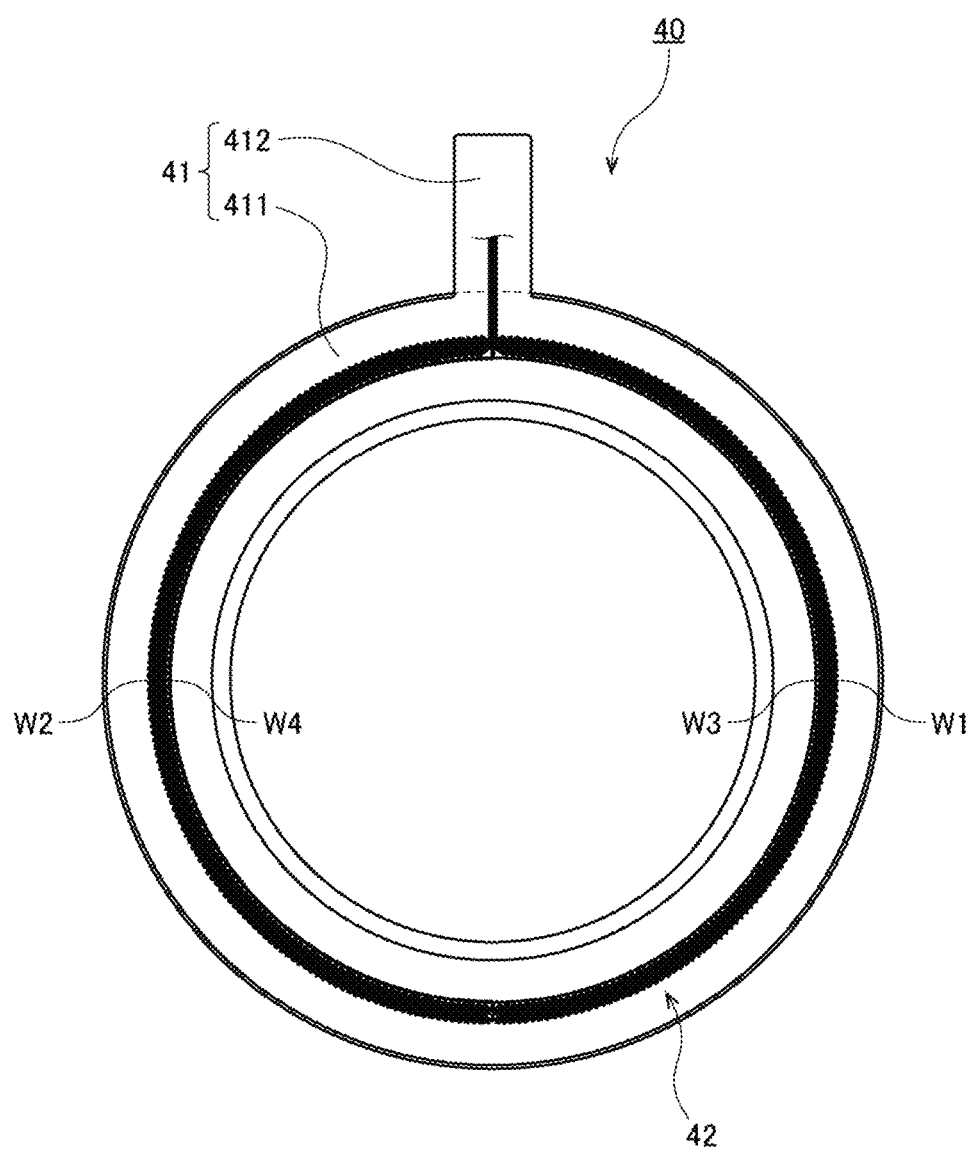

[Fig. 5]
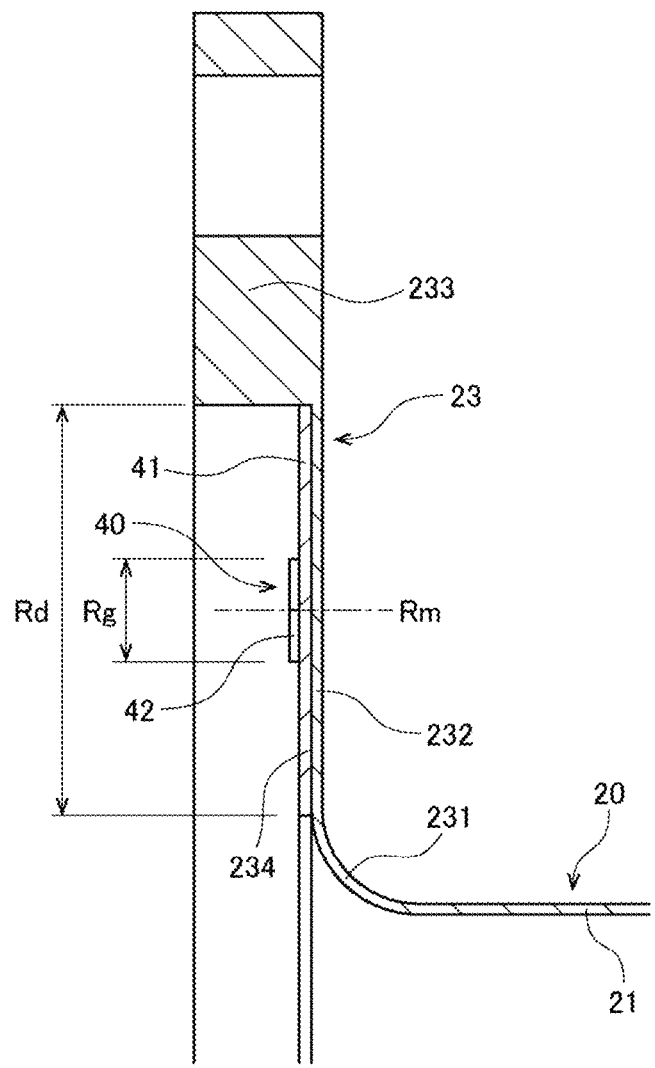

[Fig. 6]
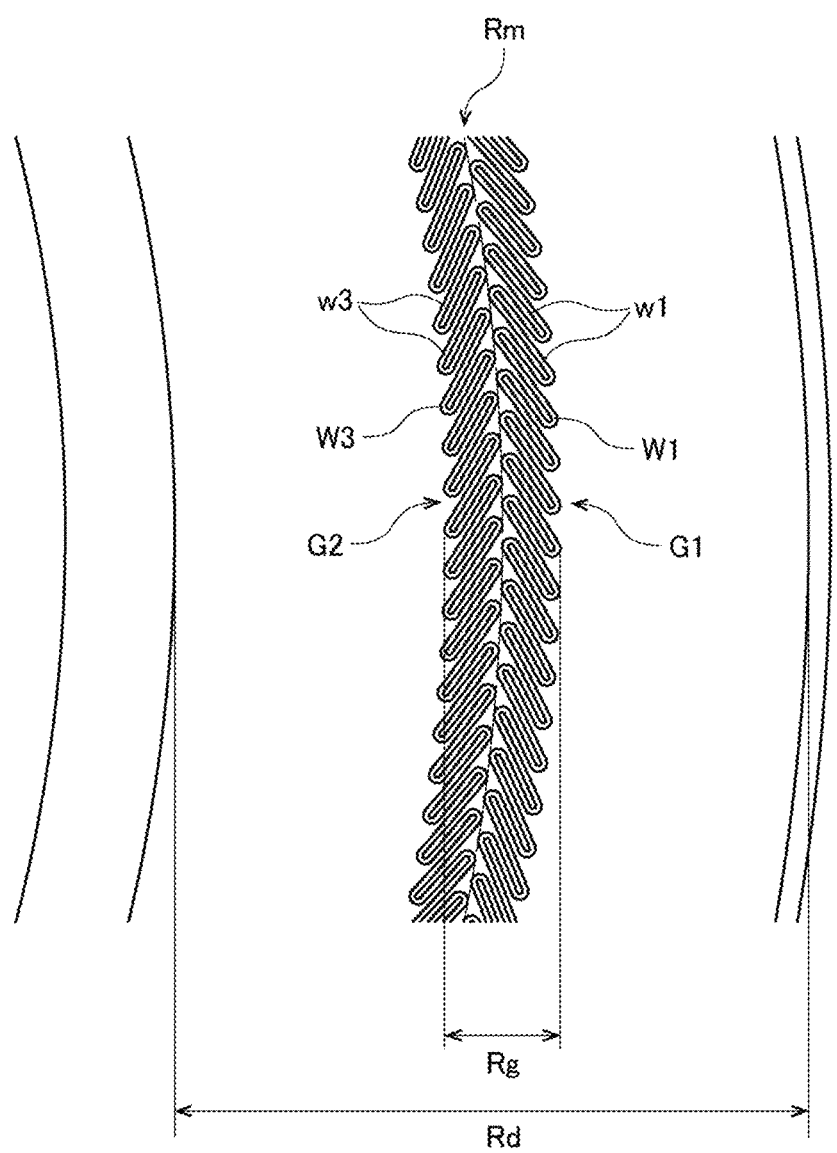

[Fig. 7]
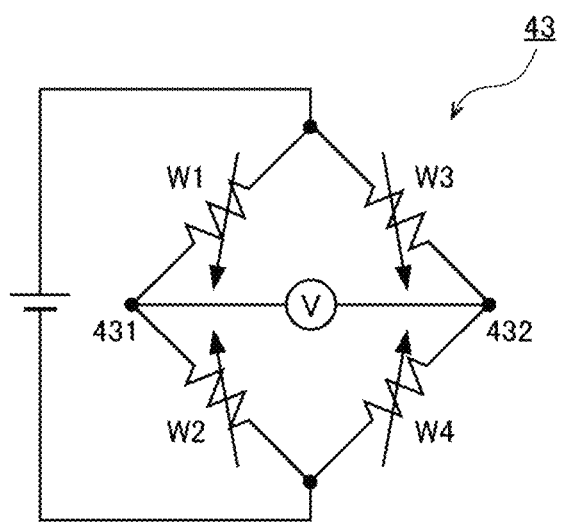

[Fig. 8]
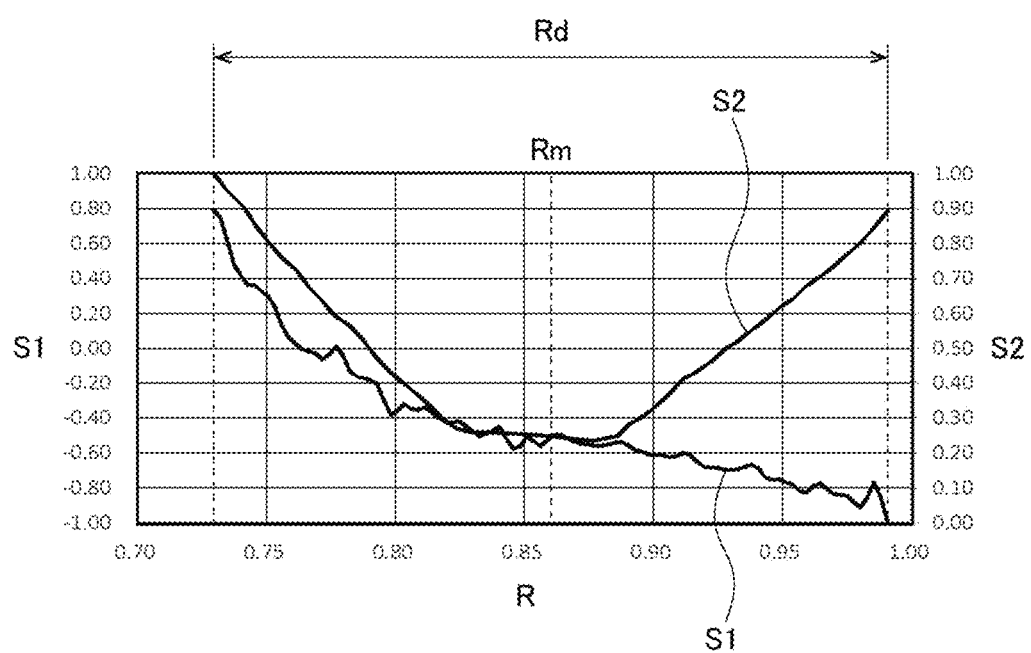

[Fig. 9]
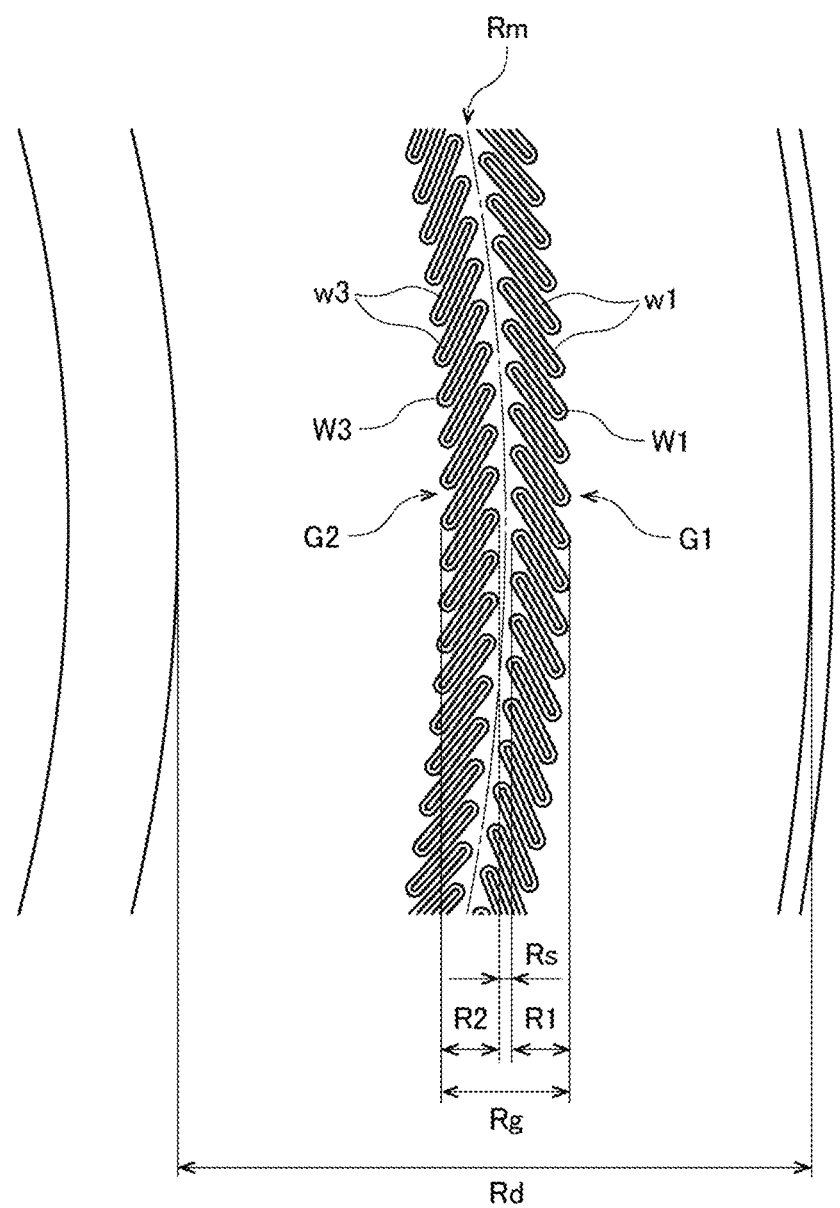

[Fig. 10]
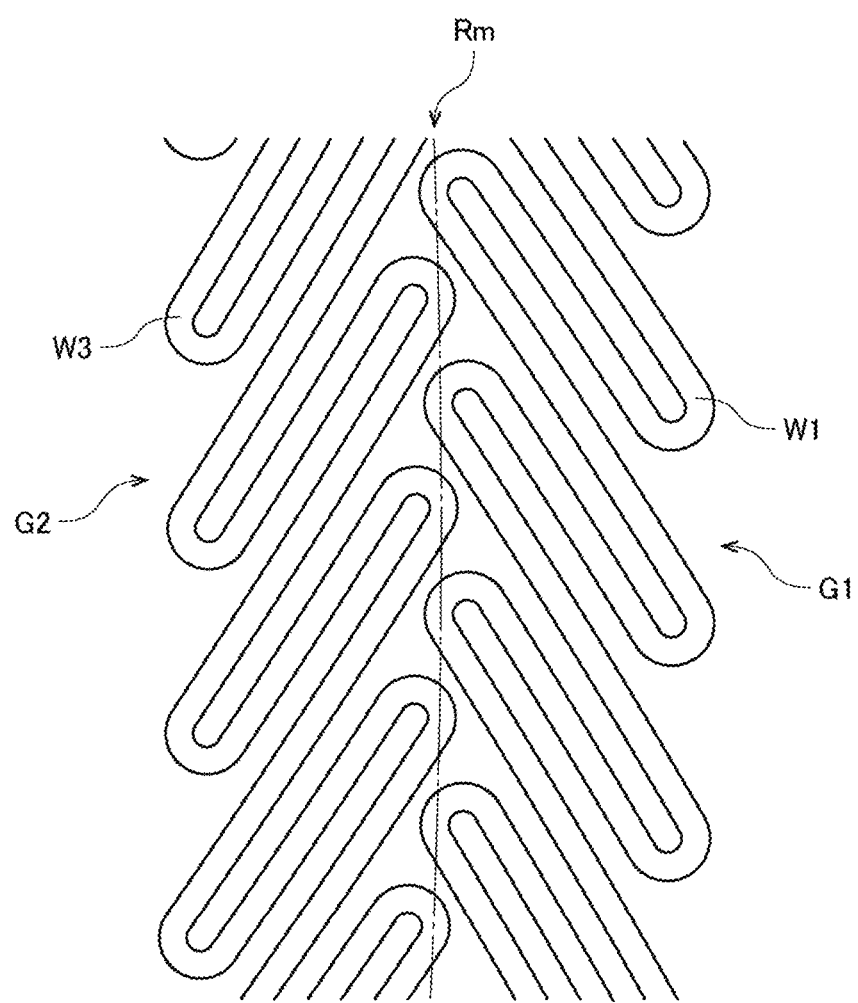

[Fig. 11]
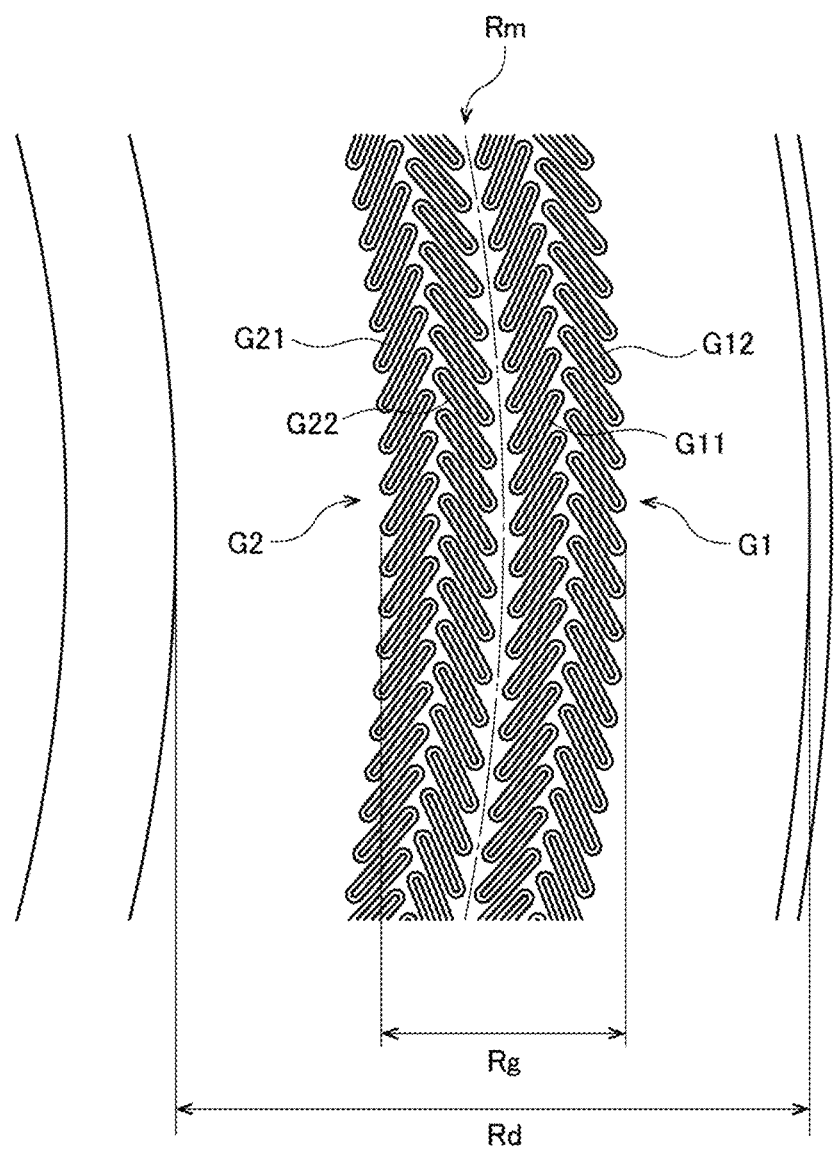

[Fig. 12]
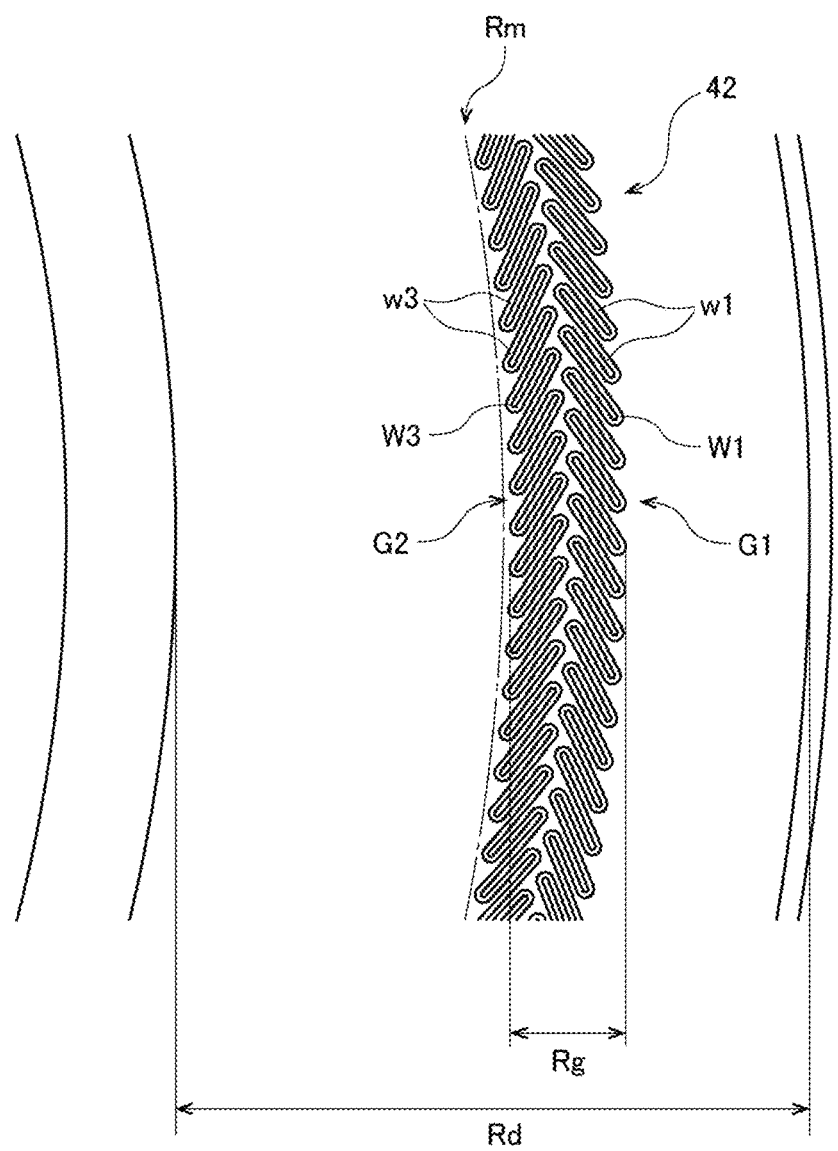

EXTERNAL GEAR, WAVE DECELERATOR, AND ROBOT

CROSS REFERENCE TO RELATED APPLICATION

The present application claims priority under 35 U.S.C. § 119 to Japanese Patent Application No. 2021-117510, filed on Jul. 16, 2021, the entire contents of which are hereby incorporated herein by reference.

1. Field of the Invention

The present disclosure relates to an external gear, a wave decelerator, and a robot.

2. Background

In recent years, a demand for a wave decelerator mounted on a joint of a robot and the like is increased. In a conventional wave decelerator, a strain gauge is stuck to an external gear that rotates at a rotational speed after deceleration. This enables detection of torque applied to the external gear.

The conventional external gear has a thin-wall diaphragm. The strain gauge is stuck to the diaphragm. The external gear is fixed to an output member on one of a radial inside and a radial outside of the diaphragm. In addition, the external gear includes a cylindrical portion extending in an axial direction from the other of the radial inside and the radial outside of the diaphragm.

Because the external gear has the above-described configuration, for example, when the external gear is elliptically deformed or when axial force acts on the external gear, a distribution of a strain generated in the external gear is not uniform due to a geometric shape of the external gear and a boundary condition when the external force is applied. Consequently, it is difficult to dispose the strain gauge in an optimum region of the external gear, and to reduce a load applied to the strain gauge while accurately detecting the strain of the external gear caused by the torque.

In a structure of the conventional external gear, the strain gauge is disposed in a wide range in a radial direction of the diaphragm. For this reason, there is a possibility of applying a large load to the strain gauge.

Accordingly, in the conventional structure, the load applied to the strain gauge is hardly reduced while the torque applied to the external gear is accurately detected.

SUMMARY

An external gear according to an example embodiment of the present invention includes a cylindrical body extending in an axial direction parallel to a central axis, external teeth that are on one side of the body in the axial direction and extend radially outward, a diaphragm expanding in a direction intersecting with the axial direction on another side in the axial direction of the body, and a strain gauge on at least one of a surface on one side in the axial direction and a surface on the other side in the axial direction of the diaphragm. The strain gauge is only in a region that is a half or less of a radial length from one end of the diaphragm in a radial direction to another end of the diaphragm in the radial direction with a radial midpoint between the one end of the diaphragm in the radial direction and the other end of the diaphragm in the radial direction as a center in a section passing through the central axis.

The above and other elements, features, steps, characteristics and advantages of the present disclosure will become more apparent from the following detailed description of the preferred embodiments with reference to the attached drawings.

BRIEF DESCRIPTION OF THE DRAWINGS

FIG. 1 is a schematic view of a robot according to an example embodiment of the present disclosure.

FIG. 2 is a longitudinal sectional view of a wave decelerator according to an example embodiment of the present disclosure.

FIG. 3 is a transverse sectional view of the wave decelerator.

FIG. 4 is a plan view of a torque sensor according to an example embodiment of the present disclosure.

FIG. 5 is a partially longitudinal sectional view of an external gear according to an example embodiment of the present disclosure.

FIG. 6 is a partially plan view of the torque sensor.

FIG. 7 is a circuit diagram illustrating a bridge circuit including a first resistance line to a fourth resistance line according to an example embodiment of the present disclosure.

FIG. 8 is a graph illustrating a strain distribution in the diaphragm.

FIG. 9 is a partially plan view illustrating a torque sensor according to a first modification according to an example embodiment of the present disclosure.

FIG. 10 is a partially plan view illustrating a torque sensor according to a second modification according to an example embodiment of the present disclosure.

FIG. 11 is a partially plan view illustrating a torque sensor according to a third modification according to an example embodiment of the present disclosure.

FIG. 12 is a partially plan view illustrating a torque sensor according to a fourth modification according to an example embodiment of the present disclosure.

DETAILED DESCRIPTION

Hereinafter, exemplary embodiments of the present application will be described with reference to the drawings.

FIG. 1 is a schematic diagram illustrating a robot 100 equipped with a wave decelerator 1 according to an embodiment. For example, the robot 100 is what is called an industrial robot that performs operations such as conveyance, processing, and assembly of components in a manufacturing line of an industrial product. As illustrated in FIG. 1, the robot 100 includes a base frame 101, an arm 102, a motor 103, and the wave decelerator 1.

The arm 102 is rotatably supported with respect to the base frame 101. The motor 103 and the wave decelerator 1 are incorporated in a joint between the base frame 101 and the arm 102. When a drive current is supplied to the motor 103, a rotational motion is output from the motor 103. Furthermore, the rotational motion output from the motor 103 is decelerated by the wave decelerator 1 and transmitted to the arm 102. Thus, the arm 102 rotates with respect to the base frame 101 at a speed after deceleration.

As described above, the robot 100 includes the wave decelerator 1. An external gear 20 described later of the wave decelerator 1 has a structure capable of reducing a load applied to the strain gauge while accurately detecting the torque acting on the external gear 20. Thus, a high-performance robot can be realized.

Subsequently, a detailed structure of the wave decelerator 1 will be described.

Furthermore, in the present application, a direction parallel to a central axis 9 of the wave decelerator 1 is referred to as an "axial direction", a direction perpendicular to the central axis 9 of the wave decelerator 1 is referred to as a "radial direction", and a direction along an arc centered on the central axis 9 of the wave decelerator 1 is referred to as a "circumferential direction". Note that the term "parallel" as used above includes both "parallel" and "substantially parallel". Moreover, the term "perpendicular" as used above includes both "perpendicular" and "substantially perpendicular".

In the embodiment, a "radial outside" corresponds to "one side in the radial direction", and a "radial inside" corresponds to "the other side in the radial direction". Accordingly, a "radially outer end" corresponds to "one end in the radial direction", and a "radially inner end" corresponds to "the other end in the radial direction".

FIG. 2 is a longitudinal sectional view illustrating the wave decelerator 1 of the embodiment. FIG. 3 is a transversely sectional view illustrating the wave decelerator 1 when viewed from an A-A position in FIG. 2. For convenience, hatch lines indicating a section are not illustrated in FIG. 3. The wave decelerator 1 is a device that decelerates rotational motion at a first rotational speed obtained from the motor 103 to a second rotational speed lower than the first rotational speed. As illustrated in FIGS. 1 and 2, the wave decelerator 1 of the embodiment includes an internal gear 10, an external gear 20, and a wave generator 30. The wave decelerator 1 can more accurately detect the torque acting on the external gear 20 by a principle described later.

The internal gear 10 is an annular gear centered on the central axis 9. The internal gear 10 is fixed to the base frame 101 of the robot 100. The internal gear 10 is disposed to be coaxial with the central axis 9. The internal gear 10 is disposed radially outward external teeth 22 described later of the external gear 20. Rigidity of the internal gear 10 is sufficiently higher than rigidity of a body 21 described later of the external gear 20. For this reason, the internal gear 10 can be regarded as a substantially rigid body. The internal gear 10 includes a plurality of internal teeth 11 in an inner circumferential surface of the internal gear 10. The plurality of internal teeth 11 are arrayed at a constant pitch in the circumferential direction on the inner circumferential surface of the internal gear 10. Each of the internal teeth 11 protrudes radially inward. That is, the internal gear 10 includes the plurality of internal teeth 11 that are disposed radially outward of the external teeth 22 while extending radially inward.

The external gear 20 is an annular gear that is bendable and deformable. The external gear 20 is fixed to the arm 102 of the robot 100. The external gear 20 is supported so as to be rotatable about the central axis 9.

The external gear 20 of the embodiment includes the body 21 and a plurality of external teeth 22. The external gear 20 further includes a disk 23. The body 21 is a cylindrical member extending in the axial direction parallel to the central axis 9. More specifically, the body 21 is a cylindrical portion extending in the axial direction around the central axis 9. An end on one side in the axial direction of the body 21 (hereinafter referred to as "axial one end") is located radially outside the wave generator 30 and radially inside the internal gear 10. The body 21 is deformable in the radial direction because the body 21 has flexibility. In particular, axial one end of the body 21 is a free end, so that axial one end of the body 21 can be displaced in the radial direction more than other portions.

The plurality of external teeth 22 are disposed on a radially outer surface at one axial end of the body 21. The plurality of external teeth 22 is arrayed at a constant pitch in the circumferential direction. Each of the external teeth 22 protrudes radially outward. That is, the plurality of external teeth 22 is disposed on axial one side of the body 21 and extends radially outward. The number of internal teeth 11 included in the internal gear 10 is slightly different from the number of external teeth 22 included in the external gear 20.

The disk 23 extends radially outward from the end on the other side in the axial direction of the body 21. As illustrated in FIG. 2, the disk 23 of the embodiment includes a curvature portion 231, a diaphragm 232, and a thick portion 233. That is, the external gear 20 includes the diaphragm 232. In the embodiment, the disk 23 is a disk member. The disk 23 is an annular member surrounding the central axis 9.

The curvature portion 231 is an annular portion extending from the end on the other side in the axial direction of the body 21 (hereinafter referred to as "the other end in the axial direction") toward the other side in the axial direction and radially outward. As illustrated in FIG. 2, the curvature portion 231 is curved in an arc shape in a section passing through the central axis 9. More specifically, the curvature portion 231 has an arc shape centered on a point located on the radial outside of the other axial end of the body 21 in the section passing through the central axis 9. The axially other end of the body 21 and the end of radial inside of the diaphragm 232 (hereinafter referred to as the "radially inner end") are smoothly connected through the curvature portion 231. That is, the external gear 20 includes the curvature portion 231 that connects the body 21 and the diaphragm 232 and is curved in an arc shape in the section passing through the central axis 9. Thus, the strength of the connection region between the body 21 and the diaphragm 232 can be improved.

The diaphragm 232 is an annular portion that expands radially outward from the end on the radially outside of the curvature portion 231. In the embodiment, the diaphragm 232 is a disk member. The diaphragm 232 expands in the direction intersecting with the axial direction on the other side in the axial direction of the body 21. The diaphragm 232 has a flat plate shape and an annular shape centered on the central axis 9. That is, the diaphragm 232 expands to one side in the radial direction on the other side in the axial direction of the body 21. In the embodiment, the diaphragm 232 extends radially outward from the body 21 on the other side in the axial direction of the body 21. Thus, as compared with the case where the diaphragm extends radially inward on the other side in the axial direction of the body, the radially inward space of the body 21 can be widened, so that the space can be effectively used. The diaphragm 232 is slightly flexurally deformable because the diaphragm 232 has the thin wall.

The thick portion 233 is an annular portion located radially outside the diaphragm 232. The thick portion 233 further expands radially outward from the end of the radially outside (hereinafter referred to as the "radially outer end") of the diaphragm 232. A thickness in the axial direction of the thick portion 233 is larger than a thickness in the axial direction of the diaphragm 232. That is, the external gear 20 includes the thick portion 233 that expands further toward one side in the radial direction from one end in the radial direction of the diaphragm 232 and has a larger thickness in the axial direction than the diaphragm 232. The thick portion 233 is fixed to the arm 102 of the robot 100 with, for example, a bolt.

In the embodiment, the thick portion 233 protrudes to the other side in the axial direction from the surface on the other side in the axial direction of the diaphragm 232. Accordingly, the other end in the axial direction of the thick portion 233 is disposed on the other side in the axial direction with respect to the other end in the axial direction of the diaphragm 232. In this way, the thick portion 233 does not protrude to the side opposite to the external teeth 22. Accordingly, the space on side of the external teeth 22 can be made larger. As a result, the degree of freedom in designing the size, shape, disposition, and the like of each component disposed on the side of the external teeth 22 is improved.

The wave generator 30 is a mechanism that generates the periodically flexural deformation in the body 21 of the external gear 20. The wave generator 30 is disposed radially inward of the external teeth 22. More specifically, the wave generator 30 is disposed radially inward the external gear 20 and is rotatable about the central axis 9. The wave generator 30 includes a cam 31 and a flexible bearing 32. The cam 31 is supported so as to be rotatable about the central axis 9. The radially outer surface of the cam 31 has an elliptical shape when viewed in the axial direction. The flexible bearing 32 is interposed between the radially outer surface of the cam 31 and a radially inside surface of the body 21 of the external gear 20. Accordingly, the cam 31 and the body 21 can rotate at different rotational speeds.

An inner ring of the flexible bearing 32 is in contact with the radially outer surface of the cam 31. The outer ring of the flexible bearing 32 is in contact with the radially inside surface of the body 21. For this reason, the body 21 is deformed in an elliptical shape along the radially outer surface of the cam 31. As a result, the external teeth 22 of the external gear 20 and the internal teeth 11 of the internal gear 10 mesh with each other at two positions corresponding to both ends of a major axis of the ellipse. At other positions in the circumferential direction, the external teeth 22 and the internal teeth 11 do not mesh with each other.

The cam 31 is connected to an output shaft of the motor 103. When the motor 103 is driven, the cam 31 rotates at the first rotational speed about the central axis 9. Thus, the major axis of the ellipse of the external gear 20 also rotates at the first rotational speed. Then, a meshing position between the external teeth 22 and the internal teeth 11 also changes at the first rotational speed in the circumferential direction. As described above, the number of internal teeth 11 of the internal gear 10 is slightly different from the number of external teeth 22 of the external gear 20. Due to this difference in the number of teeth, the meshing position between the external teeth 22 and the internal teeth 11 slightly changes in the circumferential direction every rotation of the cam 31. As a result, the external gear 20 rotates about the central axis 9 with respect to the internal gear 10 at the second rotational speed lower than the first rotational speed.

The external gear 20 includes a torque sensor 40. The torque sensor 40 is a sensor detecting the torque applied to the external gear 20. The torque sensor 40 is disposed on the diaphragm 232 of the external gear 20. The diaphragm 232 includes a surface 234 that intersects with the central axis 9 and expands in the annular shape about the central axis 9. The surface 234 is a surface on the other side in the axial direction of the diaphragm 232. The torque sensor 40 is fixed to the surface 234 of the diaphragm 232.

In the embodiment, the torque sensor 40 is disposed on the surface on the other side in the axial direction that is not opposed to the external teeth 22 out of both surfaces of the diaphragm 232. That is, the external gear 20 includes a strain gauge 42 described later. The strain gauge 42 is disposed on the surface on the other side in the axial direction of the diaphragm 232. In this way, even when the strain gauge 42 is disposed in the diaphragm 232, the space on one side in the axial direction of the diaphragm 232 can be widely used. Furthermore, at the time of manufacturing the external gear 20, it is easy to dispose the strain gauge 42 on the diaphragm 232 without touching the external teeth 22. Accordingly, it is easy to attach the strain gauge 42 to the diaphragm 232.

However, the torque sensor 40 may be disposed on the surface on one side in the axial direction of the diaphragm 232. That is, the torque sensor 40 may be disposed on at least one of the surface on one side in the axial direction and the surface on the other side in the axial direction of the diaphragm 232. In other words, the external gear 20 includes the strain gauge 42 disposed on at least one of the surface on one side in the axial direction and the surface on the other side in the axial direction of the diaphragm 232.

In the embodiment, the torque sensor 40 is located radially inside the thick portion 233. For this reason, a part of the thick portion 233 and the torque sensor 40 are disposed at the same position in the axial direction with reference to the axial position of the diaphragm 232. In this way, the thick portion 233 and the torque sensor 40 can be disposed in a narrow range in the axial direction as compared with the case where the thick portion 233 and the torque sensor 40 are disposed at different positions in the axial direction. Accordingly, even when the torque sensor 40 is disposed, an axial dimension of the entire external gear 20 including the torque sensor 40 can be reduced.

FIG. 4 is a plan view of the torque sensor 40. FIG. 5 is a partially longitudinal sectional view illustrating the external gear 20 near the torque sensor 40. As illustrated in FIGS. 4 and 5, the torque sensor 40 includes an insulating layer 41 and the strain gauge 42.

The insulating layer 41 is a flexibly deformable substrate. The insulating layer 41 expands in the direction intersecting with the central axis 9. The insulating layer 41 is made of resin that is an insulator or an inorganic insulating material. The insulating layer 41 is disposed on the surface 234 of the diaphragm 232. The insulating layer 41 includes a main body 411 and a flap 412. The main body 411 is an annular portion around the central axis 9. The flap 412 is a portion protruding radially outward from the main body 411.

The strain gauge 42 is formed on the surface of the insulating layer 41. The strain gauge 42 is made of metal that is a conductor. For example, a copper alloy, a chromium alloy, or copper is used as a material of the strain gauge 42. The strain gauge 42 includes a first resistance line W1 to a fourth resistance line W4. The first resistance line W1 to the fourth resistance line W4 are connected to an external electric circuit through an electrode (not illustrated) provided in the flap 412.

The first resistance line W1 is an arcuate pattern as a whole in which one conductor extends in the circumferential direction while bending in a zigzag manner. In the embodiment, the first resistance line W1 is provided in a semicircular shape in a range of about 180° centered on the central axis 9. FIG. 6 is a partially plan view of the torque sensor 40. As illustrated in FIG. 6, the first resistance line W1 includes a plurality of first detection lines w1. The plurality of first detection lines w1 are arrayed in the circumferential direction in a posture substantially parallel to each other. Each first detection line w1 is inclined to one side in the circumferential direction with respect to the radial direction. For example, an inclination angle of the first detection line w1 with respect to the radial direction is 45°. The ends of the first detection lines w1 adjacent to each other in the circumferential direction are alternately connected on the radial inside or the radial outside. Thus, the plurality of first detection lines w1 are connected in series as a whole.

The second resistance line W2 is an arcuate pattern as a whole in which one conductor extends in the circumferential direction while bending in a zigzag manner. In the embodiment, the second resistance line W2 is provided in a semicircular shape in a range of about 180° centered on the central axis 9. The second resistance line W2 includes a plurality of second detection lines (not illustrated). The plurality of second detection lines are arrayed in the circumferential direction in a posture substantially parallel to each other. Each second detection line is inclined to the other side in the circumferential direction with respect to the radial direction. For example, the inclination angle of the second detection line with respect to the radial direction is 45°. The ends of the second detection lines adjacent to each other in the circumferential direction are alternately connected on the radial inside or the radial outside. Thus, the plurality of second detection lines are connected in series as a whole.

The first resistance line W1 and the second resistance line W2 are arranged concentrically and line-symmetrically. The radial distance from the central axis 9 to the first resistance line W1 is substantially equal to the radial distance from the central axis 9 to the second resistance line W2.

The third resistance line W3 is an arcuate pattern as a whole in which one conductor extends in the circumferential direction while bending in a zigzag manner. In the embodiment, the third resistance line W3 is provided in a semicircular shape in a range of about 180° centered on the central axis 9. As illustrated in FIG. 6, the third resistance line W3 includes a plurality of third detection lines w3. The plurality of third detection lines w3 are arrayed in the circumferential direction in a posture substantially parallel to each other. Each third detection lines w3 is inclined to the other side in the circumferential direction with respect to the radial direction. For example, the inclination angle of the third detection line w3 with respect to the radial direction is 45°. The ends of the third detection lines w3 adjacent to each other in the circumferential direction are alternately connected on the radial inside or the radial outside. Thus, the plurality of third detection lines w3 are connected in series as a whole.

The fourth resistance line W4 is an arcuate pattern as a whole in which one conductor extends in the circumferential direction while bending in a zigzag manner. In the embodiment, the fourth resistance line W4 is provided in a semicircular shape in a range of about 180° centered on the central axis 9. The fourth resistance line W4 includes a plurality of fourth detection lines (not illustrated). The plurality of fourth detection lines are arrayed in the circumferential direction in a posture substantially parallel to each other. Each fourth detection line is inclined to one side in the circumferential direction with respect to the radial direction. For example, the inclination angle of the fourth detection line with respect to the radial direction is 45°. The ends of the fourth detection lines adjacent to each other in the circumferential direction are alternately connected on the radial inside or the radial outside. Thus, the plurality of fourth detection lines are connected in series as a whole.

The third resistance line W3 and the fourth resistance line W4 are arranged concentrically and line-symmetrically. The radial distance from the central axis 9 to the third resistance line W3 is substantially equal to the radial distance from the central axis 9 to the fourth resistance line W4. The third resistance line W3 and the fourth resistance line W4 are located radially inside the first resistance line W1 and the second resistance line W2.

FIG. 7 is a circuit diagram illustrating a bridge circuit 43 including the first resistance line W1 to the fourth resistance line W4. As illustrated in FIG. 7, the first resistance line W1 to the fourth resistance line W4 are incorporated in the bridge circuit 43. The first resistance line W1 and the second resistance line W2 are connected in series in this order. The third resistance line W3 and the fourth resistance line W4 are connected in series in this order. Then, the columns of the first resistance line W1 and the second resistance line W2 and the columns of the third resistance line W3 and the fourth resistance line W4 are connected in parallel between the positive pole and the negative pole of the power supply voltage. Furthermore, an intermediate point 431 between the first resistance line W1 and the second resistance line W2 and an intermediate point 432 between the third resistance line W3 and the fourth resistance line W4 are connected to a voltmeter V.

The resistance value of each detection line of the first resistance line W1 to the fourth resistance line W4 changes according to the torque applied to the diaphragm 232. For example, when the torque toward one side in the circumferential direction centered on the central axis 9 is applied to the diaphragm 232, the resistance value of each first detection line w1 and the resistance value of each fourth detection line decrease, and the resistance value of each second detection line and the resistance value of each third detection line w3 increase. On the other hand, when the torque toward the other side in the circumferential direction centered on the central axis 9 is applied to the external gear 20, the resistance value of each first detection line w1 and the resistance value of each fourth detection line increase, and the resistance value of each second detection line and the resistance value of each third detection line w3 decrease. As described above, the first resistance line W1 and the fourth resistance line W4 and the second resistance line W2 and the third resistance line W3 indicate the resistance value changes in the directions opposite to each other with respect to the torque.

When the resistance values of the first resistance line W1 to the fourth resistance line W4 change, the potential difference between the intermediate point 431 of the first resistance line W1 and the second resistance line W2 and the intermediate point 432 of the third resistance line W3 and the fourth resistance line W4 changes, so that the measurement value of the voltmeter V also changes. Accordingly, the direction and the magnitude of the torque applied to the diaphragm 232 can be detected based on the measurement value of the voltmeter V.

FIG. 8 is a graph illustrating a strain distribution of the diaphragm 232 when the diaphragm 232 is elliptically deformed. FIG. 8 illustrates a structural analysis result of the diaphragm 232. In the graph of FIG. 8, the horizontal axis indicates a position R in the radial direction. Specifically, the horizontal axis represents a dimensionless value obtained by dividing the distance from the central axis 9 by the distance from the central axis 9 to the radially outer end of the diaphragm 232.

In the graph of FIG. 8, two types of strains, namely, a detected strain S1 and an equivalent strain S2 are plotted. The detection strain S1 indicates the magnitude of the shear strain (shear strain ($\varepsilon r\theta$) in a cylindrical coordinate system with the central axis 9 as a reference axis) generated in the diaphragm 232 by elliptical deformation. In the graph of FIG. 8, the detected strain S1 is normalized by being divided by the maximum value of the absolute value. The equivalent strain S2 is a strain in multiple directions at each radial position indicated by a single scalar value (a strain amount corresponding to Mises stress). In the graph of FIG. 8, the equivalent strain S2 is normalized by being divided by the maximum value.

As illustrated in the graph of FIG. 8, both the detected strain S1 and the equivalent strain S2 increase near the radially inner end in a radial range Rd of the diaphragm 232. In the radial range Rd of the diaphragm 232, in the vicinity of the radially outer end, the detected strain S1 decreases, but the equivalent strain S2 increases.

Accordingly, in the torque sensor 40 of the embodiment, as illustrated in FIGS. 5 and 6, the strain gauge 42 is disposed only near the center of the diaphragm 232 in the radial direction. Specifically, the radial region Rg in which the strain gauge 42 is disposed is a region that is a half or less of a radial length from the radially outer end to the radially inner end of the diaphragm 232 with a radial midpoint Rm between the radially outer end and the radially inner end of the diaphragm 232 as the center in the section passing through the central axis 9. That is, the strain gauge 42 is disposed only in a region that is a half or less of the radial length from one end in the radial direction to the other end in the radial direction of the diaphragm 232 with the radial midpoint Rm between one end in the radial direction and the other end in the radial direction of the diaphragm 232 as the center in the section passing through the central axis 9. That is, the entire radial region Rg where the strain gauge 42 is disposed is included in the radial range Rd of the diaphragm 232.

As described above, when being disposed only in the vicinity of the radial midpoint Rm of the diaphragm 232, the strain gauge 42 does not detect strain in the vicinity of the radially inner end and the vicinity of the radially outer end. As illustrated in the graph of FIG. 8, in the vicinity of the radial midpoint Rm, both the amounts of change in the detection strain S1 and the equivalent strain S2 are small. The strain gauge 42 detects only a stable strain amount in the vicinity of the radial midpoint Rm. Accordingly, the torque sensor 40 can accurately detect the torque applied to the external gear 20.

In addition, in the case where the strain gauge 42 is disposed in a wide region in the radial direction of the diaphragm 232, the large strain is generated in the diaphragm 232 due to the elliptical deformation or force in the central-axis direction in the vicinity of the radially inner end and the vicinity of the radially outer end of the diaphragm 232, and there is a possibility of applying a large load to the strain gauge 42. However, in the embodiment, the strain gauge 42 is disposed only in a region that is a half or less of the radial range Rd centered on the radial midpoint Rm, so that application of the large load to the strain gauge 42 can be prevented.

The strain gauge 42 is preferably disposed only in a region of 40% or less of the radial length from one end in the radial direction to the other end in the radial direction of the diaphragm 232 with the radial midpoint Rm between the one end in the radial direction and the other end in the radial direction of the diaphragm 232 as the center. In other words, the region Rg where the strain gauge 42 is disposed is more desirably the region of 40% or less of the radial length from the radially outer end to the radially inner end of the diaphragm 232 with the radial midpoint Rm between the radially outer end and the radially inner end of the diaphragm 232 as the center. Thus, the torque sensor 40 can more accurately detect the torque applied to the external gear 20.

Furthermore, the region Rg where the strain gauge 42 is disposed is more desirably the region of 30% or less of the radial length from the radially outer end to the radially inner end of the diaphragm 232 with the radial midpoint Rm between the radially outer end and the radially inner end of the diaphragm 232 as the center. Thus, the torque sensor 40 can more accurately detect the torque applied to the external gear 20.

As illustrated in FIG. 6, the strain gauge 42 of the embodiment includes a first gauge G1 and a second gauge G2. The first gauge G1 includes the first resistance line W1 and the second resistance line W2 described above. The second gauge G2 includes the third resistance line W3 and the fourth resistance line W4 described above. The first gauge G1 is disposed radially outside the second gauge G2. The radially outer end of the first gauge G1 is disposed radially outside the radial midpoint Rm of the diaphragm 232. The radially inner end of the second gauge G2 is disposed radially inside the radial midpoint Rm of the diaphragm 232.

In the embodiment, the radially inner end of the first gauge G1 is disposed at substantially the same radial position as the radial midpoint Rm of the diaphragm 232. The radially outer end of the second gauge G2 is disposed at substantially the same radial position as the radial midpoint Rm of the diaphragm 232. In this way, the first gauge G1 and the second gauge G2 can be disposed in proximity to each other in the radial direction in the vicinity of the radial midpoint Rm of the diaphragm 232. Accordingly, the entire first gauge G1 and the entire second gauge G2 can be disposed in a region where an error is hardly generated. In addition, an error between the first gauge G1 and the second gauge G2 is reduced as compared with the case where the first gauge G1 and the second gauge G2 are disposed with a wide gap interposed therebetween in the radial direction. Consequently, for example, when differential output that obtains a difference between outputs of the first gauge G1 and the second gauge G2 is performed, an error of the differential output becomes small.

In particular, in the embodiment, the radial length of the first gauge G1 and the radial length of the second gauge G2 are substantially equal to each other. In this way, the difference in the magnitude of the error between the first gauge G1 and the second gauge G2 can be prevented.

Although the embodiment as an example of the present disclosure is described above, the present disclosure is not limited to the embodiment. Hereinafter, various modifications will be described focusing on differences from the embodiment. In the following description of the modification, the same reference numerals are used in the description of the respective regions in order to facilitate understanding of the differences between the embodiment and the modification.

FIG. 9 is a partially plan view illustrating the torque sensor 40 according to a first modification. In the example of FIG. 9, the radially inner end of the first gauge G1 is disposed radially outside the radial midpoint Rm of the diaphragm 232. Furthermore, the radially outer end of the second gauge G2 is disposed radially inside the radial midpoint Rm of the diaphragm 232. In this manner, a radial gap may be provided between the radially inner end of the first gauge G1 and the radially outer end of the second gauge G2.

However, a radial distance Rs between the radially inner end of the first gauge G1 and the radially outer end of the second gauge G2 is desirably shorter than both a radial length R1 of the first gauge G1 and a radial length R2 of the second gauge G2. That is, the first gauge G1 and the second gauge G2 are desirably disposed at positions close to each other in the radial direction. Thus, the entire first gauge G1 and the entire second gauge G2 can be disposed in the region where the error is hardly generated.

FIG. 10 is a partially plan view illustrating the torque sensor 40 according to a second modification. In the example of FIG. 10, the first gauge G1 and the second gauge G2 are disposed so as to partially overlap each other in the radial direction. Specifically, the radially inner end of the first gauge G1 is disposed radially inside the radial midpoint Rm of the diaphragm 232. The radially outer end of the second gauge G2 is disposed radially outside the radial midpoint Rm of the diaphragm 232.

In this way, the entire first gauge G1 and the entire second gauge G2 can be disposed at a position closer to the radial midpoint Rm of the diaphragm 232. Accordingly, the first gauge G1 and the second gauge G2 can be disposed in the region where the error is hardly generated. In addition, the first gauge G1 and the second gauge G2 can be disposed in the limited region in the radial direction, and a wiring area of the first gauge G1 and the second gauge G2 can be increased.

FIG. 11 is a partially plan view illustrating the torque sensor 40 according to a third modification. In the example of FIG. 11, the first gauge G1 includes a first inside gauge G11 and a first outside gauge G12. The first outside gauge G12 is disposed radially outside the first inside gauge G11. The second gauge G2 includes a second inside gauge G21 and a second outside gauge G22. The second outside gauge G22 is disposed radially outside the second inside gauge G21. In addition, the second outside gauge G22 is disposed radially inside the first inside gauge G11.

In this way, more resistance wires than those in the embodiment can be disposed on one surface of the insulating layer 41. In the embodiment, the torque sensor 40 includes only one bridge circuit 43 including the four resistance lines W1 to W4. On the other hand, in the example of FIG. 11, two bridge circuits including four resistance lines can be provided. Accordingly, the torque sensor 40 can output detection signals from the two bridge circuits.

Accordingly, that the two torque sensors 40 are normally operated can be checked by comparing the two detection signals.

FIG. 12 is a partially plan view illustrating the torque sensor 40 according to a fourth modification. In the example of FIG. 12, both the first gauge G1 and the second gauge G2 are disposed radially outside the radial midpoint Rm of the diaphragm 232. That is, in the example of FIG. 12, the strain gauge 42 is disposed only on one side in the radial direction with respect to the radial midpoint Rm of the diaphragm 232. In this way, the region radially inside the radial midpoint Rm of the diaphragm 232 can be effectively used for purposes other than the disposition of the strain gauge 42. The strain gauge 42 is disposed radially outside the radial midpoint Rm of the diaphragm 232, so that the strain gauge 42 can be disposed in a longer circumferential region.

The strain gauge 42 may be disposed only on the other side in the radial direction with respect to the radial midpoint Rm of the diaphragm 232. In this case, the region radially outside the radial midpoint Rm of the diaphragm 232 can be effectively used for purposes other than the disposition of the strain gauge 42. Consequently, the longer circumferential region of the diaphragm 232 can be used for other purposes.

In the embodiment, the strain gauge 42 is disposed on the surface of the insulating layer 41 that is a flexibly deformable substrate. However, the strain gauge 42 may be disposed on the surface 234 of the diaphragm 232. For example, the insulating film is formed on the surface 234 of the diaphragm 232, and the conductor layer is formed on the surface of the insulating film by sputtering or the like. The strain gauge 42 may be formed by removing an unnecessary portion of the conductor layer by chemical means such as etching or physical means such as laser. For example, an inorganic insulating material is used for the insulating film.

The signal processing circuit that processes the detection signal of the strain gauge 42 may be attached to the external gear 20 together with the strain gauge 42. Alternatively, the signal processing circuit may be provided at the position away from the external gear 20. That is, the external gear 20 only needs to be equipped with at least the strain gauge 42 that is a resistance line pattern in the torque sensor 40.

In addition, the external gear 20 may further include a rotation angle sensor that detects a rotation angle of the rotational motion input to the external gear 20. Thus, the periodic error of the detection signal of the torque sensor 40 can be corrected based on the detection value of the rotation angle detection sensor. Accordingly, the torque applied to the external gear 20 can be detected more accurately.

The external gear 20 may further include a temperature sensor that measures a temperature of the external gear 20. Thus, the error caused by the temperature change of the detection signal of the torque sensor 40 can be corrected based on the detection value of the temperature sensor. Accordingly, the torque applied to the external gear 20 can be detected more accurately.

In the embodiment, the torque sensor 40 includes the four resistance lines of the first resistance line W1 to the fourth resistance line W4. The bridge circuit 43 is a full bridge circuit including the four resistance lines of the first resistance line W1 to the fourth resistance line W4. However, the torque sensor 40 may include only two resistance lines. In this case, the bridge circuit 43 may be a half bridge circuit including the two resistance lines and two fixed resistors.

The external gear 20 of the embodiment is what is called a "hat-shaped" gear in which the diaphragm 232 expands radially outward from the body 21. The hat-shaped external gear 20 is excellent in that the space on the radial inside of the body 21 can be effectively used. However, the external gear 20 may be what is called a "cup-shaped" gear in which the diaphragm 232 expands radially inward from the body 21. In the case of the cup-shaped external gear 20, the "radially inside" corresponds to the "one side in the radial direction", and the "radially outside" corresponds to the "other side in the radial direction". Accordingly, the "radially inner end" corresponds to "one end in the radial direction", and the "radially outer end" corresponds to "the other end in the radial direction".

In the embodiment, the wave decelerator 1 mounted on the robot 100 has been described. However, the wave decelerator 1 having the similar structure may be mounted on another device such as an assist suit or an automatic guided vehicle.

In addition, detailed configurations of the external gear, the wave decelerator, and the robot may be appropriately changed without departing from the gist of the present disclosure. In addition, the elements that appear in the embodiment and the modification may also be appropriately combined in a range in which there is no contradiction.

The present application can be applied to, for example, the external gear, the wave decelerator, and the robot. Features of the above-described preferred embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An external gear comprising:
   a cylindrical body extending in an axial direction parallel to a central axis;
   external teeth that are on one side of the body in the axial direction and extend radially outward;
   a diaphragm extending in a direction intersecting with the axial direction on another side of the body in the axial direction; and
   a strain gauge on at least one of a surface of the diaphragm on one side in the axial direction and a surface on another side of the diaphragm in the axial direction; wherein
   the strain gauge is only in a region that is a half or less of a radial length from one end of the diaphragm in a radial direction to the other end of the diaphragm in the radial direction with a radial midpoint between the one end of the diaphragm in the radial direction and the other end of the diaphragm in the radial direction defining a center in a section passing through the central axis.

2. The external gear according to claim 1, further comprising a curvature portion that connects the body and the diaphragm and is curved in an arc shape in the section passing through the central axis.

3. The external gear according to claim 1, wherein the strain gauge is on a surface on the other side of the diaphragm in the axial direction.

4. The external gear according to claim 1, further comprising a thick portion that extends toward one side of the diaphragm in the radial direction from one end of the diaphragm in the radial direction and has a larger thickness in the axial direction than the diaphragm; wherein
   the diaphragm extends to one side of the body in the radial direction to another side of the body in the axial direction; and
   the thick portion includes on a side of the diaphragm in the axial direction.

5. The external gear according to claim 1, wherein the strain gauge is only on one side of the diaphragm in the radial direction with respect to the radial midpoint.

6. The external gear according to claim 1, wherein the strain gauge includes:
   a first gauge including one end in the radial direction on one side in the radial direction with respect to the radial midpoint of the diaphragm; and
   a second gauge including another end in the radial direction at the other side of the diaphragm in the radial direction; and
   a radial distance between the other end of the first gauge in the radial direction and one end of the second gauge in the radial direction is shorter than both a radial length of the first gauge and a radial length of the second gauge.

7. The external gear according to claim 6, wherein a radial length of the first gauge is equal or substantially equal to a radial length of the second gauge.

8. The external gear according to claim 6, wherein
   the other end of the first gauge in the radial direction is on the other side of the diaphragm in the radial direction with respect to the radial midpoint; and
   one end of the second gauge in the radial direction is on one side of the diaphragm in the radial direction with respect to the radial midpoint.

9. The external gear according to claim 6, wherein
   the first gauge includes:
      a first inside gauge; and
      a first outside gauge radially outside of the first inside gauge; and
   the second gauge includes:
      a second inside gauge; and
      a second outside gauge radially outside the second inside gauge.

10. The external gear according to claim 1, wherein the diaphragm extends radially outward from the body on the other side of the body in the axial direction.

11. The external gear according to claim 5, wherein the diaphragm extends radially outward from the body on the other side of the body in the axial direction.

12. The external gear according to claim 6, wherein the diaphragm extends radially outward from the body on the other side of the body in the axial direction.

13. The external gear according to claim 1, wherein the strain gauge is only in a region of about 40% or less of a radial length from one end of the diaphragm in the radial direction to another end of the diaphragm in the radial direction with the radial midpoint between the one end of the diaphragm in the radial direction and the other end of the diaphragm in the radial direction of the diaphragm as a center.

14. The external gear according to claim 5, wherein the strain gauge is only in a region of about 40% or less of a radial length from one end of the diaphragm in the radial direction to another end of the diaphragm in the radial direction with the radial midpoint between the one end of the diaphragm in the radial direction and the other end of the diaphragm in the radial direction as a center.

15. The external gear according to claim 6, wherein the strain gauge is only in a region of about 40% or less of a radial length from one end of the diaphragm in the radial direction to another end of the diaphragm in the radial direction with the radial midpoint between the one end of the diaphragm in the radial direction and the other end of the diaphragm in the radial direction of the diaphragm as a center.

16. A wave decelerator comprising:
   the external gear according to claim 1;
   an internal gear that is located radially outward from the external teeth and includes a plurality of internal teeth extending radially inward; and
   a wave generator that is radially inward of the external gear and is rotatable about the central axis.

17. A robot comprising the wave decelerator according to claim 16.

* * * * *